Aug. 10, 1926.

W. A. GREEN

TOBACCO PIPE

Filed Oct. 9, 1925

1,595,654

INVENTOR
William A. Green
By Kay, Totten & Martin,
Attorneys.

Patented Aug. 10, 1926.

1,595,654

UNITED STATES PATENT OFFICE.

WILLIAM A. GREEN, OF PITTSBURGH, PENNSYLVANIA.

TOBACCO PIPE.

Application filed October 9, 1925. Serial No. 61,459.

My invention relates to tobacco pipes, and has for its object the provision of means for preventing bits of tobacco or ash from passing into the mouth of the user, and means for preventing saliva or moisture of condensation from accumulating in the smoke passage.

Figure 1:
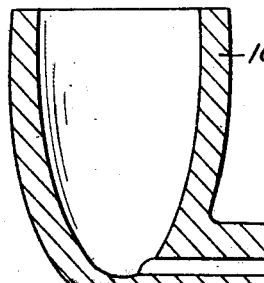
Figure 3:
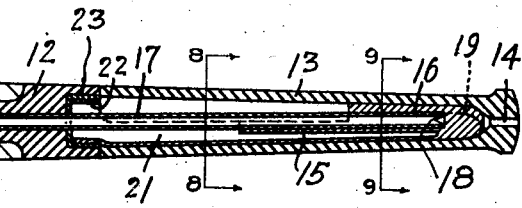
Figure 2:
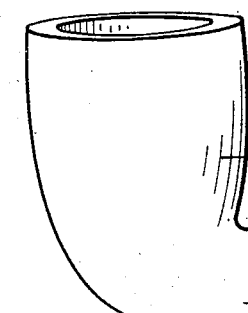
Figure 4:
Figures 5, 6:
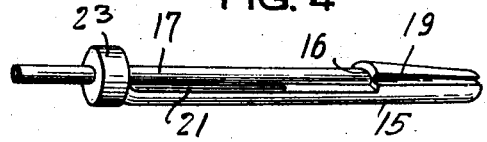
Figure 7:
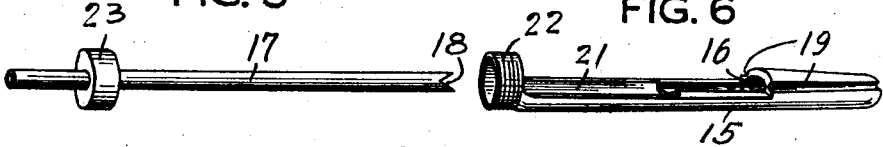
Figures 8, 9:
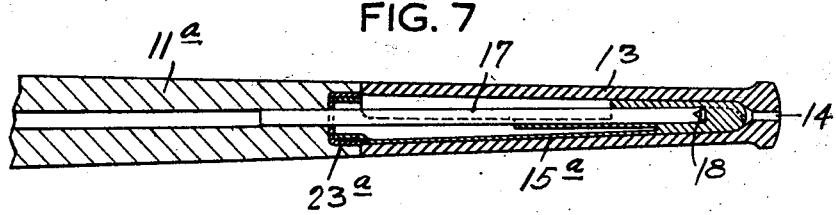

Some of the forms which my invention may take are shown in the accompanying drawing wherein Fig. 1 is a longitudinal sectional view of a pipe embodying my invention; Fig. 2 is a perspective view of the bowl portion thereof; Fig. 3 is a perspective view of the mouth piece portion; Fig. 4 is a perspective view of the moisture trap which I may employ, removed from the stem of Fig. 1; Fig. 5 is a view showing the smoke tube removed from the trap of Fig. 4; Fig. 6 is a view showing the trap of Fig. 4, with the smoke tube removed; Fig. 7 is a fragmentary sectional view similar to Fig. 1 but showing a modified form of device; Fig. 8 is a view taken on the line 8—8 of Fig. 1, and Fig. 9 is a view taken on the line 9—9 of Fig. 1.

In Fig. 1, I have shown a pipe bowl 10 of somewhat the usual form, provided with a stem portion 11 that is recessed as indicated, for the reception of a block 12 that is provided with a central perforation in alignment with the smoke passage of the stem portion 11. The members 11 and 12 may be made of any suitable material, such as wood, and fit snugly together by pressure, although the abutting longitudinal surfaces may be provided with inter-engaging screw threads, if desired.

The mouthpiece 13 may be of somewhat the usual form, but instead of being provided with a longitudinal passage or perforation 14 throughout its length, is recessed for the reception of a moisture trap 15 that may be of metal or other suitable material and which fits snugly within the recessed portion of the mouthpiece 14. The trap 15 is provided with a recessed portion 16 into which the rear end of the tube 17 extends. The tube 17 is provided with V-notches 18 at its rear end so that smoke which flows through the tube from its forward to its rear end may emerge from its rear end and flow forwardly out of the recess 16, along the sides of the tube 17, the recessed portion 16 being of greater width than the tube 17. The top and bottom faces of the tube 17, may however, have a snug fit with the top and bottom walls of the recess in the portion 16. Smoke which emerges from the forward end of the portion 16 is then drawn backwardly through grooves 19 and thence to the passage 14.

The trap 15 is provided with a semicircular recess 21 and with an annular portion 22 that is threaded on its exterior surface for engagement with a collar 23 that is secured to the tube 17. In assembling the tube 17 and the trap 15, the tube is inserted to substantially the position shown in Fig. 4, and the collar 23 then screwed upon the portion 22. When the tube and the trap have been assembled as shown in Fig. 4, they may be inserted in the block 12, by pressure, in the manner shown in Fig. 1, the tube 17 preferably extending some distance into the passage in the block 12, and the collar 23 having snug fitting engagement with the notched recess in the block 12.

When the parts are thus assembled, it will be seen that smoke will pass through the stem 11 to the block 12, tube 17, passages 19 and the passage 14. The condensation and saliva which accumulate in the mouthpiece will flow through the grooves 19 and into the well 21, where it will be out of the path of smoke being drawn from the bowl 10. Bits of tobacco which may be drawn from the pipe bowl will either lodge within the recessed portion 16 or be projected outwardly toward the well 21 when emerging from said recess, since the direction of travel of the smoke is reversed at that point and the tobacco will not be carried back along the grooves 16 to the passage 14.

It will be seen that a considerable volume of smoke may accumulate within the space contained in and surrounding the trap 15, so that it will become cooled, and furthermore any solid material drawn through the tube 17 may settle in the trap and not be drawn through the grooves 19.

The trap 15 may be cleaned from time to time by withdrawing the mouth piece 13 from the block 12 and then removing either the collar 23 and the tube 17 from the trap 15 or by removing the trap 15 from the mouthpiece, as desired.

Referring to Fig. 7, I have shown a structure similar to that of Figs. 1 to 6 but wherein the block 12 is eliminated. In this structure the stem 11$^a$ is provided with a recess for the reception of the collar 23$^a$ and the forward end of the trap 15$^a$. In the device of Fig. 1 it is possible to apply my invention to the pipe stem 11 of usual form, the block 12 serving as a coupling member. In the form shown in Fig. 7 it may be necessary to modify the rear end of the stem 11ª by reaming the same out for the reception of the collar 23ª.

The trap 15 and tube 17 may be made integral if desired, and the tube 17 need not extend entirely to the rear of the chamber within the portion 16, in which case the V-shaped recesses 18 will not be required. Instead of the recesses 18 circular openings could be provided for the emission of smoke drawn from the bowl 10.

I claim as my invention:—

1. The combination with a tobacco pipe provided with a bowl and a mouthpiece, of a moisture receptacle comprising a member having a semicircularly recessed portion for the reception of moisture, a second recessed portion closed at its rear end and extending into the mouthpiece, and a smoke tube extending rearwardly from said bowl into said second recessed portion.

2. The combination with a tobacco pipe provided with a stem having a smoke orifice at its rear end and a bowl, of a removable moisture receptacle mounted in said stem and comprising a receptacle channeled for a portion of its length and provided with a recessed portion that communicates with said channeled portion, and a smoke tube extending into said recessed portion and communicating at its forward end with the pipe bowl, the recessed portion being provided with a longitudinal groove on its exterior surface to permit communication between the interior of the recess and the said orifice.

3. The combination with a tobacco pipe provided with a bowl and a recessed mouthpiece having an orifice, of a deflector member having a recessed portion disposed within said mouthpiece, a forwardly extending portion, a smoke tube supported by said extension and having its rear end extending into said recessed portion, the smoke tube communicating at its forward end with said bowl, and a smoke groove provided exteriorly of the said recessed portion to provide communication between the interior of the recessed portion and said orifice.

In testimony whereof I, the said WILLIAM A. GREEN have hereunto set my hand.

WILLIAM A. GREEN.